(12) United States Patent
Bleazard

(10) Patent No.: US 6,877,613 B2
(45) Date of Patent: Apr. 12, 2005

(54) BICYCLE STORAGE APPARATUS AND METHOD

(76) Inventor: Craig S. Bleazard, 160 North St., Grantsville, UT (US) 84029

( * ) Notice: Subject to any disclaimer, the term of this patent is extended or adjusted under 35 U.S.C. 154(b) by 3 days.

(21) Appl. No.: 10/431,184

(22) Filed: May 7, 2003

(65) Prior Publication Data

US 2004/0222172 A1 Nov. 11, 2004

(51) Int. Cl.$^7$ .................................................. A47F 5/00
(52) U.S. Cl. ........................ 211/19; 211/5; 211/89.01; 248/316.5
(58) Field of Search ................... 211/89.01, 5, 19, 211/20; 248/316.5

(56) References Cited

U.S. PATENT DOCUMENTS

| | | | | |
|---|---|---|---|---|
| 572,770 A | * | 12/1896 | Putnam ........................ | 211/19 |
| 573,171 A | * | 12/1896 | Westphal ...................... | 70/234 |
| 611,401 A | * | 9/1898 | White .......................... | 70/234 |
| 618,507 A | * | 1/1899 | Henderson et al. ............ | 211/5 |
| 621,072 A | * | 3/1899 | Gregory ........................ | 211/5 |
| 631,665 A | * | 8/1899 | Potter ............................ | 211/5 |
| 661,677 A | * | 11/1900 | Taylor .......................... | 211/22 |
| 2,639,813 A | * | 5/1953 | Risvold et al. ................ | 211/19 |
| 4,702,447 A | * | 10/1987 | Westwood, III ....... | 248/231.51 |
| 4,830,196 A | | 5/1989 | Csanady | |
| 5,096,150 A | * | 3/1992 | Westwood ............. | 248/231.51 |
| 5,246,120 A | | 9/1993 | Walker | |
| 5,988,402 A | * | 11/1999 | Mayfield ..................... | 211/20 |

OTHER PUBLICATIONS

Widgets.ws, Bicycle Rack—Double Vertical, http://www.widgets.ws/prod/StacksandStacks/SPORTS-RE.../Bicycle-Rack-Double-Vertical.htm.
Leonardo Bicycle Wall and Storage Hook, AutoSport, AutoSportCatalog.com, http://www.autosportcatalog.com/index.cfm?fa=p&pid+1844&cid=72.
Bicycle Storage Systems and Racks, Organize-Everything.com, http://www.organize-everything.com/bicyclestorage.html.
Bicycle Rack—Storage System Oak, Stacks and Stacks HomeWares, http://www.stacksandstacks.com/html/6100.htm?AID=10273848&PID=606239&SID=264-6102.
Brandsonsale.com, http://store4.yimg.com/l/brandsonsale-store__1753__15099039.
Double Bike Rack, SkyMall, Inc., http://www.skymall.../skystore?process=prodDisplay&action=&pid=101849058&catId=9783142.
Bike Hoist Pully System, SkyMall, Inc., http://www.skymall.../skystore?process=prodDisplay&action=&pid=101849105&catId=9783142.
Double Bike Rack, SkyMall, Inc., http://www.skymall.com/webapp/skystore?process=prodDisplay&action=zoom&pid=101849058.
Bike Hoist Pully System, SkyMall, Inc., http://www.skymall.com/webapp/skystore?process=prodDisplay&action=zoom&pid=101849105.

* cited by examiner

Primary Examiner—Robert W. Gibson, Jr.
(74) Attorney, Agent, or Firm—Madson & Metcalf

(57) ABSTRACT

A bicycle storage apparatus and method are provided. The apparatus may have a collar within which a core member is rotatably engaged. A pair of locking arms is pivotally attached to the core member such that each of the locking arms has an open position designed to permit insertion or withdrawal of a bicycle wheel and a closed position designed to block withdrawal of the wheel. Rotation of the core member locks the locking arms in the closed position. A bicycle can be stored in the apparatus by elevating the front wheel above the rear wheel, inserting the front wheel into engagement with the locking arms, and rotating the front wheel from a substantially vertical plane to lock the locking arms in the closed position. The collar and the core member may be designed such that they can be formed by blow molding with a simple, two-plate mold system.

28 Claims, 5 Drawing Sheets

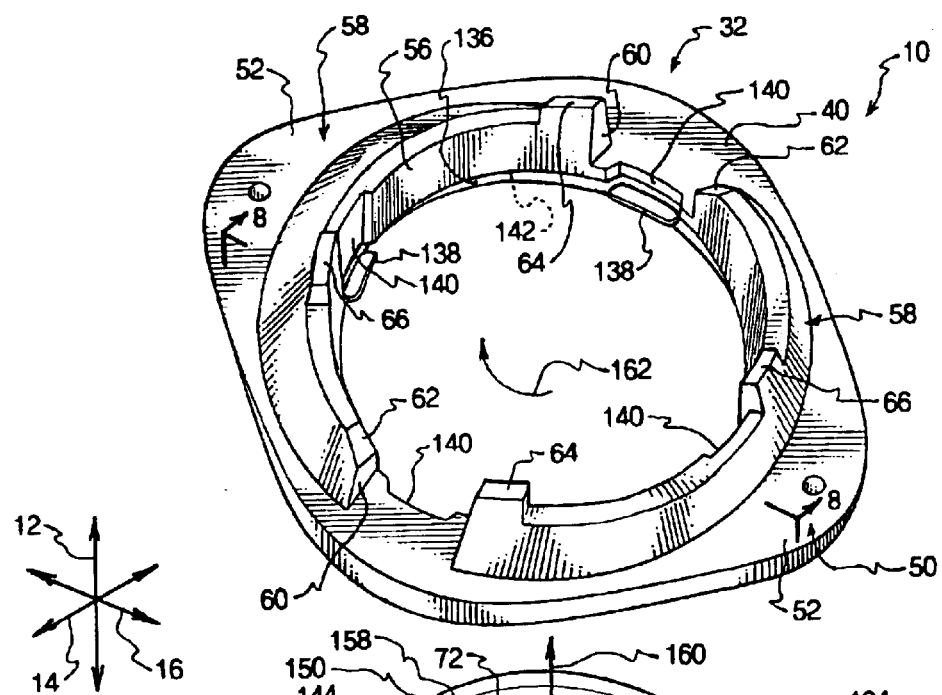
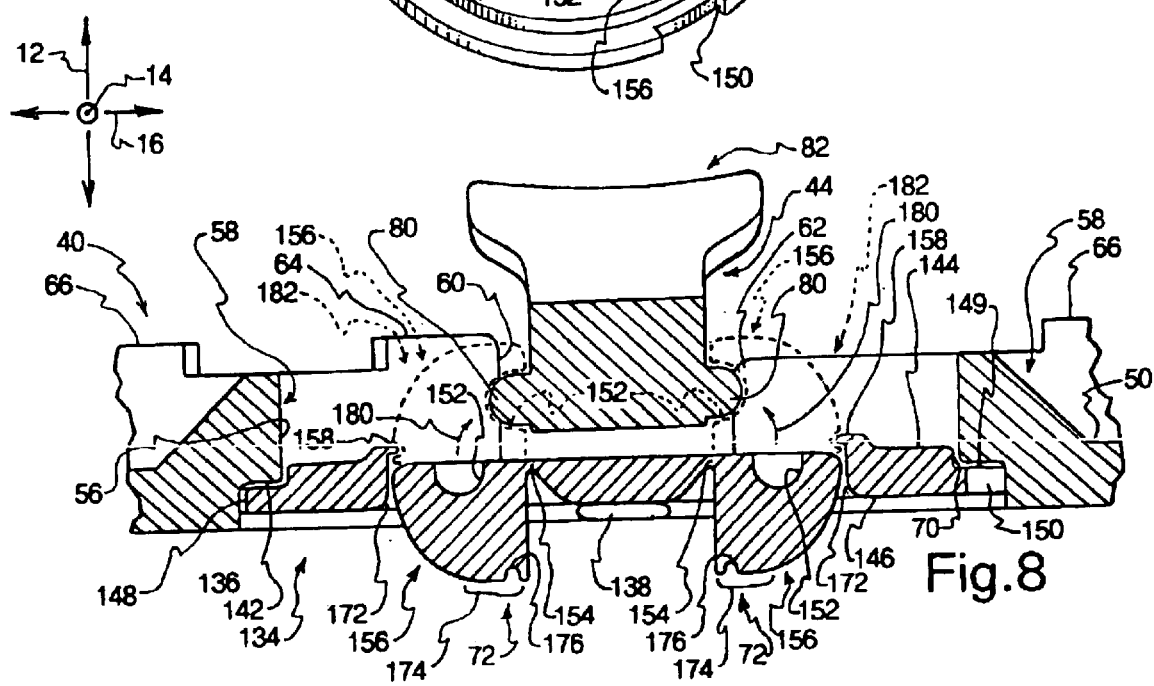
Fig. 7
Fig. 8

BICYCLE STORAGE APPARATUS AND METHOD

BACKGROUND OF THE INVENTION

1. Field of the Invention

The present invention relates to vehicle storage. More specifically, the present invention relates to an apparatus and method that enables bicycles to be compactly and easily stored and retrieved from storage for use.

2. Description of Related Art

Bicycles represent one of the most common forms of transportation and recreation. Many households own multiple bicycles. However, due to their length, bicycles require a considerable amount of storage space. Furthermore, bicycles are often leaned against a kickstand or some other object. Thus, they are stored in an unstable manner and may easily be knocked over or otherwise damaged.

Due to these problems, racks, hooks, and other storage devices have been developed. However, such devices also have a number of deficiencies. Storage racks may provide some stability, but often require as much space, or possibly even more space than the bicycle, alone, would require. Other devices such as storage hooks and clamps require the bicycle to be lifted and placed on the device. Bicycles are awkward to lift, and many people, especially children, simply lack the strength to lift the bicycle onto or off of the device.

Furthermore, some known devices require that the user perform a number of additional steps to latch or unlatch the bicycle, or to move it between a stowed position and an accessible position. This makes bicycle storage somewhat inconvenient and, in some cases, provides only a minimal benefit over storage of the bicycle without any storage device. Some known storage devices are, themselves, quite heavy, bulky, and/or expensive.

Hence, it would be an advancement in the art to provide a bicycle storage device capable of compactly storing bicycles in a manner that does not require the entire weight of the bicycle to be lifted by the user. Furthermore, it would be an advancement in the art to provide a bicycle storage device that would enable a bicycle to be quickly and easily retained for storage or removed for use. Yet further, it would be an advancement in the art to provide such a bicycle storage device that is compact, lightweight, and inexpensive.

SUMMARY OF THE INVENTION

The apparatus of the present invention has been developed in response to the present state of the art, and in particular, in response to the problems and needs in the art that have not yet been fully solved by currently available bicycle storage devices. Thus, it is an overall objective of the present invention to provide a bicycle storage apparatus and method capable of remedying the shortcomings of the prior art.

To achieve the foregoing objective, and in accordance with the invention as embodied and broadly described herein, an apparatus for storing bicycles is provided. The apparatus is designed to be attached to a wall so that a front wheel of the bicycle can be retained against the wall. The apparatus is disposed at an attachment portion of the wall with a height selected such that the bicycle is disposed with the front wheel generally over the rear wheel, so that the bicycle takes up a comparatively narrow footprint.

In one embodiment, the apparatus includes a base member in the form of a collar. The collar rotatably retains a shuttle, which takes the form of a core member with a generally disk-like shape. A first locking arm and a second locking arm are pivotally attached to the shuttle. The collar has a plate with an interior surface that generally encircles the core member. Retention features, in the form of arcuate lips, extend from the plate along the interior surface. Each of the arcuate lips has a clockwise limiting feature and a counterclockwise limiting feature.

The core member has a peripheral edge that abuts the peripheral edge of the collar so that the core member is rotatably captured by the collar. The core member has two anchors for each of the locking arms; each locking arm is pivotally attached to a pair of anchors. Each locking arm then pivots between an open position that permits withdrawal of the front wheel and a closed position that blocks withdrawal of the front wheel.

Each locking arm has a gripping end, a receiving end, and a locking feature. The gripping end is designed to capture the front wheel. The receiving end induces the locking arms to close in response to pressure from the front wheel when the front wheel is inserted into the apparatus. The locking feature enables the locking arms to be locked in the closed position by rotating the shuttle.

Thus, a bicycle may easily be engaged by the apparatus. According to one storage method, the bicycle is first drawn into a substantially vertical orientation, so that the front wheel is positioned generally above the rear wheel. The locking arms are moved into the open position if they are not already open. The front wheel is oriented within a substantially vertical plane and moved toward the locking arms. When the tire of the front wheel contacts the receiving ends, the locking arms are pivoted to the closed position so that the griping ends block removal of the wheel from the locking arms.

The front wheel is then rotated to some angle with respect to the substantially vertical plane to rotate the core member within the collar. The locking arms rotate with the core member so that the locking features of the locking arms are restrained by the arcuate lips of the collar. Thus, the locking arms are moved to the closed position by rotation of the core member to retain the bicycle.

The bicycle may be withdrawn from the apparatus by generally reversing the above steps. More precisely, the front wheel is rotated back into the substantially vertical plane to rotate the core member back to its original position, thereby unlocking the locking arms. The front wheel is then drawn outward from the apparatus so that a rim of the front wheel presses against the gripping ends to move the locking arms to the open position. The front wheel can then be fully withdrawn, and the bicycle can be returned to its normal horizontal orientation for riding.

According to one method of manufacturing the apparatus, the collar, the core member, and the locking arms are manufactured from a plastic by a method such as blow molding. The collar has a number of tabs that extend inward, parallel to an annular retention surface. The tabs are aligned with notches in the arcuate lips and the plate of the collar so that the tabs collar can be formed with a simple blow-molding process, in which only two molds or "plates" converge to define the shape of the collar.

The core member is made by first molding a workpiece with an outward side and an inward side. The anchors are initially disposed proximate the outward side so that holes of the anchors face perpendicular to the outward and inward sides. Each anchor is connected to the remainder of the workpiece by a plastic section thin enough to form a living hinge. The workpiece has an annular extension with notches that correspond in number and spacing to the tabs of the collar. In this configuration, the workpiece can also be formed by a simple, dual plate blow-molding process.

The tabs of the collar are then aligned with the notches of the workpiece, and the workpiece is inserted into the collar so that the tabs pass through the notches and the annular extension of the core member abuts the annular retention surface of the collar. The workpiece is rotated within the collar to move the notches of the annular extension out of alignment with the tabs so that the workpiece is retained by the collar.

The workpiece is rotated to what will be the unlocked position of the core member. The first and second locking arms are then positioned in their intended locations. When the locking arms are in place, the anchors of the workpiece are pivoted ninety degrees about their corresponding living hinges such that the hole of each anchor rotates into engagement with the corresponding shaft of one of the locking arms.

Each anchor has a notch that rotates into alignment with an attachment ridge on the outward side of the collar. Each anchor is shaped such that the attachment ridge and the notch are urged into engagement with each other when the anchor is rotated ninety degrees. Thus, the anchors remain in place to pivotally capture the shafts of the locking arms. Upon rotation of the anchors into place, the workpiece has been properly manipulated to form the core member.

The shape of the arcuate lips prevents the core member from being rotated to a position that aligns the notches of the annular extension with the tabs. Hence, the core member remains relatively permanently in engagement with the core, and the apparatus is ready for use to store a bicycle. Multiple such apparatuses may be disposed along a wall to permit relatively compact storage of a plurality of bicycles.

Through the use of the bicycle storage apparatus and method of the present invention, one or more bicycles may be stored in a relatively compact and stable manner. Furthermore, the bicycles may be easily stored or removed from storage for use without requiring the application of a considerable amount of strength. The apparatus may be easily and inexpensively manufactured. These and other features and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 7 is a perspective view illustrating assembly of the collar and a workpiece according to one method of manufacturing the apparatus of FIG. 1; and FIG. 8 is a side elevation, cutaway section view of the collar and workpiece illustrating motion of the anchors into place to form the core member and retain the locking arms according to the manufacturing method.

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 8, is not intended to limit the scope of the invention, as claimed, but is merely representative of presently preferred embodiments of the invention.

For this application, the phrases "connected to," "coupled to," and "in communication with" refer to any form of interaction between two or more entities, including mechanical, electrical, magnetic, electromagnetic, and thermal interaction. The phrase "attached to" refers to a form of mechanical coupling that restricts relative translation or rotation between the attached objects. The phrases "pivotally attached to" and "slidably attached to" refer to forms of mechanical coupling that permit relative rotation or relative translation, respectively, while restricting other relative motion.

The phrase "attached directly to" refers to a form of attachment by which the attached items are either in direct contact, or are only separated by a single fastener, adhesive, or other attachment mechanism. The term "abutting" refers to items that are in direct physical contact with each other, although the items may not be attached together. The terms "integrally formed" refer to a body that is manufactured integrally, i.e., as a single piece, without requiring the assembly of multiple pieces. Multiple parts may be integrally formed with each other if they are formed from a single workpiece.

Figure 1:
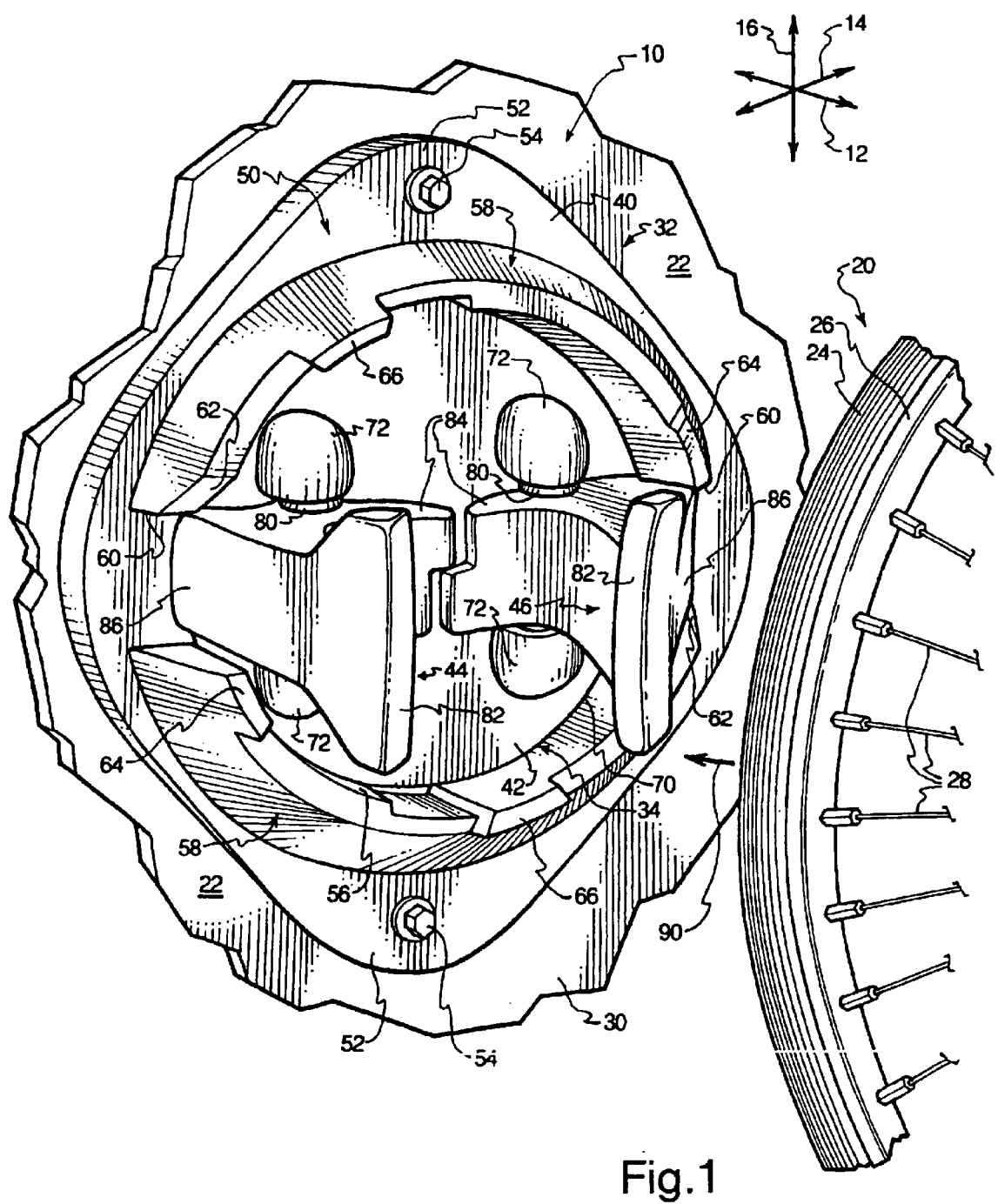
FIG. 1 is a perspective view of an apparatus for storing bicycles according to the invention, in the open and unlocked position to receive a front wheel of a bicycle.

Referring to FIG. 1, a perspective view illustrates a bicycle storage apparatus, or apparatus 10, according to one embodiment of the invention. The apparatus 10 has a longitudinal direction 12, a lateral direction 14, and a transverse direction 16. The apparatus 10 is used to secure a wheel 20, such as a front wheel 20 of a bicycle, to a wall 22. The wheel 20 may be any of a variety of known bicycle wheel types. As shown in FIG. 1, the wheel 20 may have a tire 24, a rim 26, and a plurality of spokes 28 that support the rim 26 with respect to a hub (not shown).

The wall 22 has an attachment portion 30 to which the apparatus 10 is attached to receive the wheel 20. The apparatus 10 of FIG. 1 is designed to retain a bicycle in a substantially vertical orientation. Hence, the attachment portion 30 is disposed at a height (i.e., position in the transverse direction 16) such that when the wheel 20 is elevated generally above the rear wheel (not shown) of the bicycle and the rear wheel rests on the ground, the apparatus 10 is disposed generally at the same height as the wheel 20.

As illustrated, the apparatus 10 has a base member 32 fixedly attached to the attachment portion 30 to movably retain a shuttle 34. The base member 32 and shuttle 34 may take a variety of configurations in which the shuttle 34 rotates, translates, or otherwise moves with respect to the base member 32. In the embodiment of FIG. 1, the base member 32 takes the form of a collar 40 with a generally annular configuration. The shuttle 34 is a core member 42 that is disposed generally within the collar 40 such that the core member 42 is rotatable within the collar 40.

In this application, "base member" refers to any object that can be affixed to a wall or other stationary structure. "Shuttle" refers to any device that is rotationally, translationally, or otherwise movably attachable to a base member. "Collar" refers to a structure with an opening capable of rotatably receiving a member. "Core member" refers to a member designed to rotate within an opening.

A first locking arm 44 is attached to the core member 42 in such a manner that the first locking arm 44 is movable with respect to the core member 42 between open and closed positions. In the embodiment of FIG. 1, the first locking arm 44 is pivotally attached to the core member 42. The apparatus 10 of FIG. 1 also includes a second locking arm 46 disposed generally opposite to the first locking arm 44. The second locking arm 46 also pivots with respect to the core member 42 between open and closed positions. As illustrated in FIG. 1, the locking arms 44, 46 are both in the open position to receive the wheel 20. "Locking arm" refers to a structure that is rotatable, translatable, or otherwise movable to retain or release a bicycle component such as the wheel 20.

The collar 40 includes a plate 50 oriented generally parallel to the attachment portion 30 of the wall 22. The plate 50 has a pair of attachment flanges 52 that extend generally in the transverse direction 16. The attachment flanges 52 are attached to the attachment portion 30 via fasteners 54, which may be bolts, as illustrated, or any other suitable attachment device. The collar 40 also has an interior surface 56 with a generally cylindrical profile designed to rotatably retain the core member 42.

Retention features protrude from the vicinity of the interior surface 56 along the longitudinal direction 12. In the apparatus 10 of FIG. 1, the retention features take the form of a pair of arcuate lips 58 that provide a longitudinal continuation of the interior surface 56. The arcuate lips 58 are separated from each other by a pair of breaks 60 disposed at the lateral extents of the collar 40.

Each of the arcuate lips 58 has a beveled portion 62 designed to facilitate motion of the locking arms 44, 46 against the arcuate lips 58. Each of the arcuate lips 58 also has a counterclockwise limiting feature designed to limit counterclockwise rotation of the core member 42 and a clockwise limiting feature designed to limit clockwise rotation of the core member 42. In the apparatus 10, the counterclockwise limiting features take the form of tabs 64 and the clockwise limiting features take the form of tabs 66, all of which extend from the arcuate lips 58 in the longitudinal direction 12. The operation of the beveled portion 62 and the tabs 64, 66 will be described in greater detail subsequently.

The core member 42 has a peripheral edge 70 with a generally cylindrical profile disposed directly inward of the interior surface 56 of the collar 40 such that the core member 42 is rotatably retained by the interior surface 56. The core member 42 also has a plurality of anchors 72 protruding generally in the longitudinal direction 12 to pivotally retain the locking arms 44, 46. In the apparatus 10 of FIG. 1, two anchors 72 are provided for each of the locking arms 44, 46.

Each of the locking arms 44, 46 has a pair of integrally formed shafts 80 that are rotatably retained by the corresponding pair of anchors 72. Each of the locking arms 44, 46 of the apparatus 10 also has a gripping end 82 disposed to pivot inward about the shafts 80 in such a manner that, after insertion of the wheel 20, the gripping ends 82 are disposed adjacent to the rim 26 to block longitudinal motion of the wheel 20 away from the apparatus 10. If the locking arms 44, 46 are not locked in place, they can be removed from the closed position in response to outward pressure of the rim 26 against the gripping ends 82 so that the gripping ends 82 no longer block withdrawal of the wheel 20.

Additionally, each of the locking arms 44, 46 has a receiving end 84 positioned generally inward of the corresponding gripping end 82. Upon insertion, the wheel 20 presses against the receiving ends 84 to induce the locking arms 44, 46 to pivot into the closed position. Each of the locking arms 44, 46 also has a locking feature designed to cooperate with one of the arcuate lips 58 to lock the locking arms 44, 46 in the closed position in response to rotation of the core member 42 within the collar 40. As illustrated in FIG. 1, the locking features are locking abutments 86 disposed at the lateral extents of the locking arms 44, 46. The operation of the locking abutments 86 will be described in greater detail subsequently.

In FIG. 1, the apparatus 10 is in the open, unlocked configuration to permit insertion of the wheel 20 into engagement with the apparatus 10. The locking arms 44, 46 are thus in the open position. The core member 42 cannot be rotated significantly in either direction because the locking abutments 86 are disposed in the breaks of the arcuate lips 58. The locking abutments 86 are disposed proximate the plate 50 within the breaks 60. Hence, the arcuate lips 58 interfere with motion of the locking abutments 86 in the transverse direction 16, thereby preventing significant rotation of the core member 42.

The wheel 20 is disposed within a substantially vertical plane to align the wheel 20 with the open locking arms 44, 46. More precisely, the wheel 20 is disposed within the plane generally defined by the longitudinal and transverse directions 12, 16. In this application, a "substantially vertical plane" does not refer to a plane that is precisely vertical. Rather, the apparatus 10 permits the wheel 20 to be inserted along some relatively small angle with respect to a precisely vertical plane.

The wheel 20 may be inserted along an engagement direction, illustrated by an arrow 90 generally parallel to the longitudinal direction 12. The tire 24 contacts the receiving ends 84 of the locking arms 44, 46 and presses against them to pivot the locking arms 44, 46 from the open position to the closed position. The receiving ends 84 may be interdigitated or otherwise designed such that the tire 24 contacts both receiving ends 84 substantially simultaneously. The gripping ends 82 extend to a position adjacent to the rim 26 to block removal of the wheel 20 from the locking arms 44, 46. This is the configuration illustrated in FIG. 2.

Figure 2:
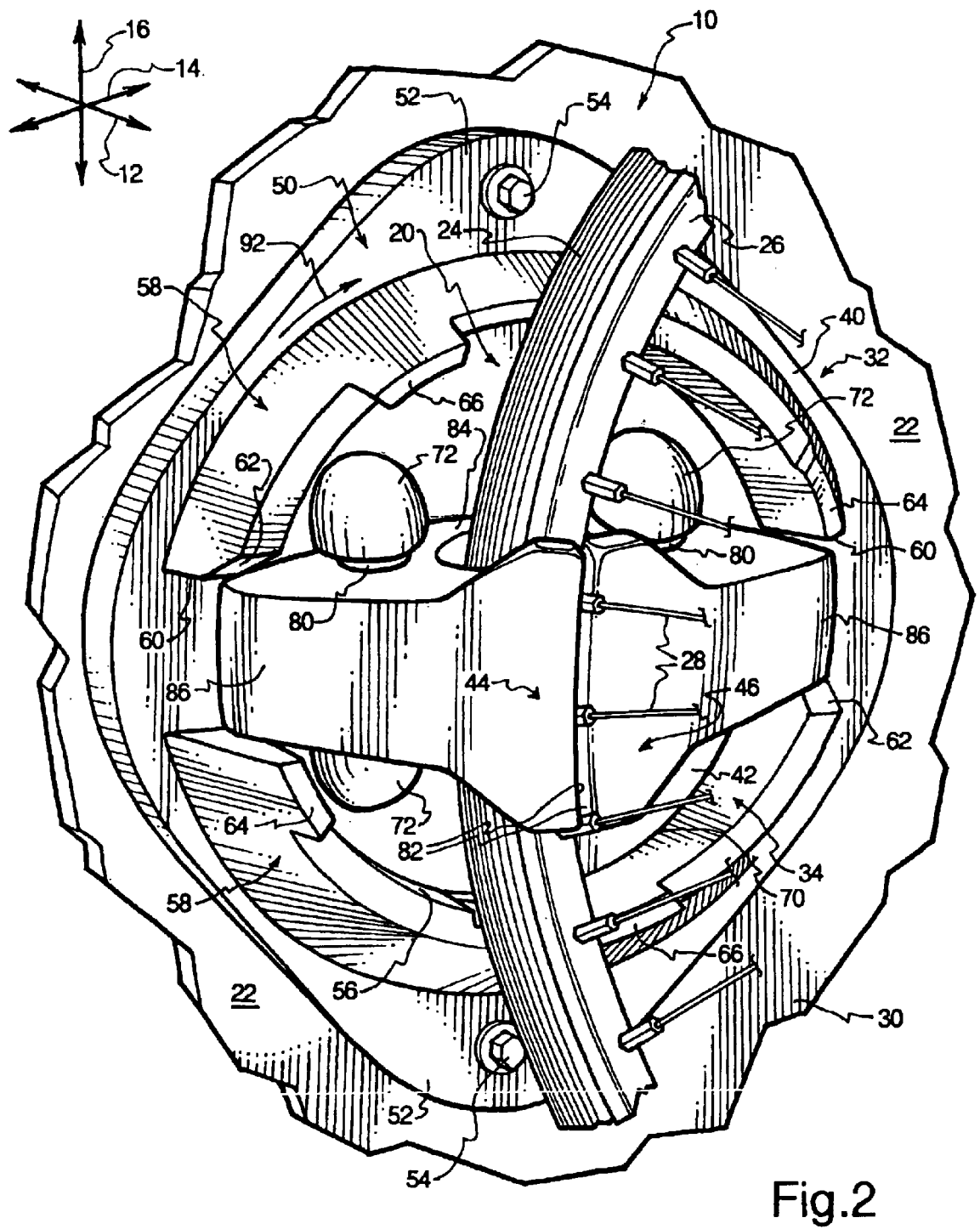
FIG. 2 is a perspective view of the apparatus for storing bicycles of FIG. 1, in the closed and unlocked position after insertion of the wheel into engagement with the apparatus.

Referring to FIG. 2, a perspective view illustrates the apparatus 10 of FIG. 1, in the closed, unlocked configuration. The wheel 20 has been inserted into engagement with the apparatus 10 as indicated above. Thus, the locking arms 44, 46 have moved to the closed position. The gripping ends 82 are disposed adjacent to the rim 26 to sandwich the spokes 28. The gripping ends 82 are shaped to avoid exerting excessive pressure against the spokes 28 to ensure that the spokes 28 are not damaged by the apparatus 10.

In FIG. 2, the locking arms 44, 46 are not locked in the closed position. Thus, if the wheel 20 is drawn away from the apparatus 10 in the longitudinal direction 12, i.e., in a direction generally opposite to the engagement direction, the rim 26 will push against the gripping ends 82 of the locking arms 44, 46 to move the locking arms 44, 46 back to the open position, thereby permitting removal of the wheel 20 from the apparatus 10.

The locking arms 44, 46 may be locked in the closed position by rotating the locking arms 44, 46 and the core member 42 with respect to the collar 40. Motion of the locking arms 44, 46 to the closed position moves the locking abutments 86 away from the plate 50 so that the locking abutments 86 are able to slide over the arcuate lips 58.

However, the tabs 64 of the arcuate lips 58 extend in the longitudinal direction 12 to an extent that they interfere with rotation of the locking abutments 86 in a counterclockwise direction. Hence, the core member 42 and the locking arms 44, 46 are only able to rotate in the clockwise direction, i.e., in a locking direction indicated by an arrow 92. The beveled portions 62 facilitate motion of the locking abutments 86 out of the breaks 60 and over the arcuate lips 58 along the locking direction. Motion of the core member 42 and the locking arms 44, 46 along the locking direction results in the configuration illustrated in FIG. 3.

Figure 3:
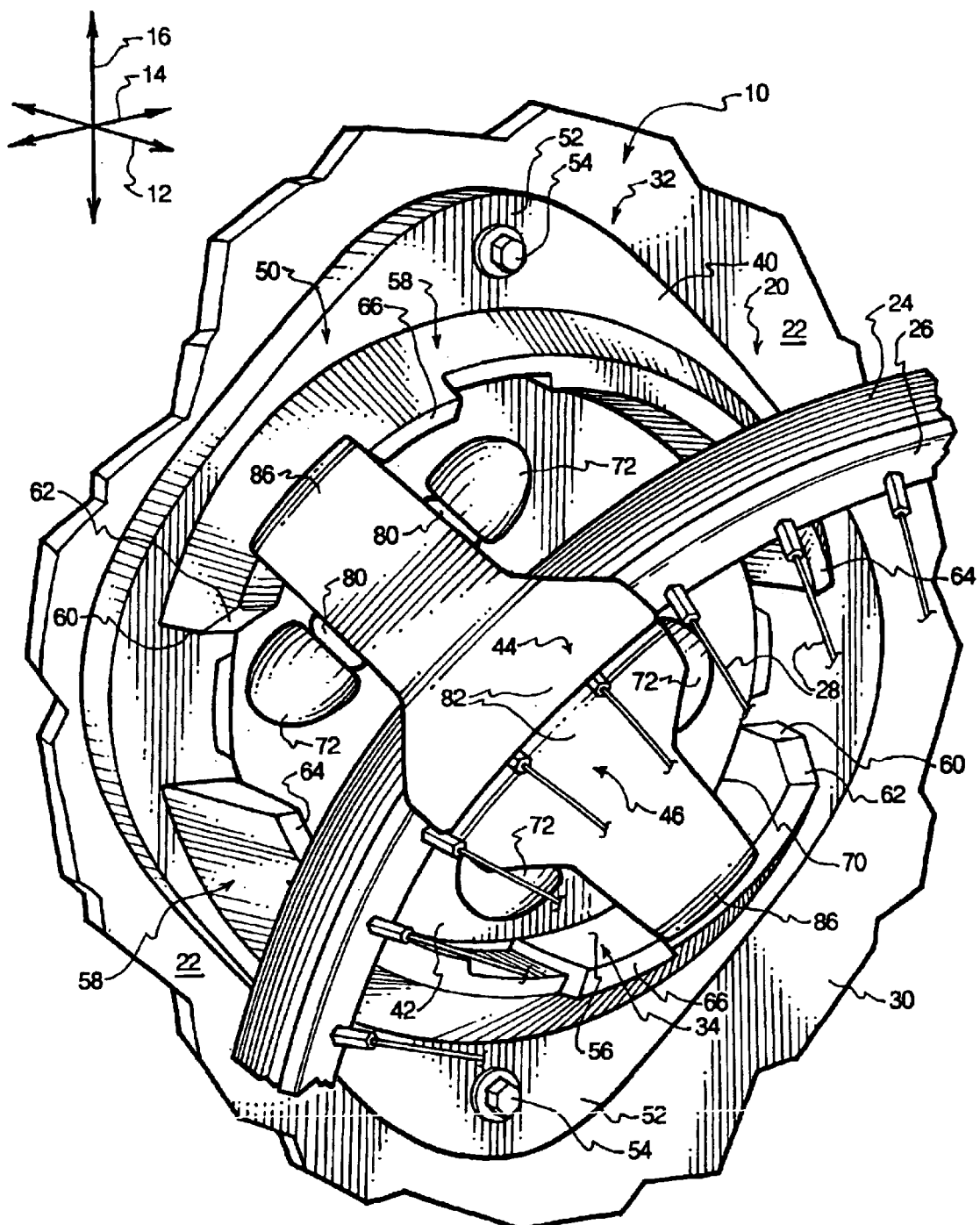
FIG. 3 a perspective view of the apparatus for storing bicycles of FIG. 1, in the closed and locked position to retain the front wheel until the apparatus is returned to the unlocked position.

Referring to FIG. 3, a perspective view illustrates the apparatus 10 in the closed, locked configuration to retain the wheel 20. The core member 42 and the locking arms 44, 46 have been rotated with respect to the collar 40, along the locking direction, as indicated previously. The tabs 66 limit rotation of the core member 42 and the locking arms 44, 46 in the clockwise direction because the locking abutments 86 abut the tabs 66 when the core member 42 and locking arms 44, 46 have rotated along a maximum angle along the locking direction.

The maximum angle may be any angle to which the wheel 20 is able to rotate with respect to the remainder of the bicycle. For example, the maximum angle may range from about fifteen degrees to about ninety degrees. More specifically, the maximum angle may range from about thirty degrees to about sixty degrees. Yet more specifically, the maximum angle may be about forty-five degrees.

Once the locking abutments 86 are disposed over the arcuate lips 58, the arcuate lips 58 interfere with motion of the locking abutments 86 back toward the plate 50, in the longitudinal direction 12. Hence, the locking arms 44, 46 are unable to rotate back to the open position. The locking arms 44, 46 are effectively locked in the closed position to retain the wheel 20.

The locking arms 44, 46 remain in the closed position until the core member 42 and the locking arms 44, 46 are rotated counterclockwise, i.e., in a direction opposite to the engagement direction, to return the apparatus 10 to the configuration of FIG. 2. The wheel 20 may then be withdrawn form the apparatus 10 in a direction generally opposite to the engagement direction. Pressure of the rim 26 against the gripping ends 82 opens the locking arms 44, 46 to release the wheel 20, thereby returning the apparatus 10 and the wheel 20 to the configuration illustrated in FIG. 1.

Figure 4:
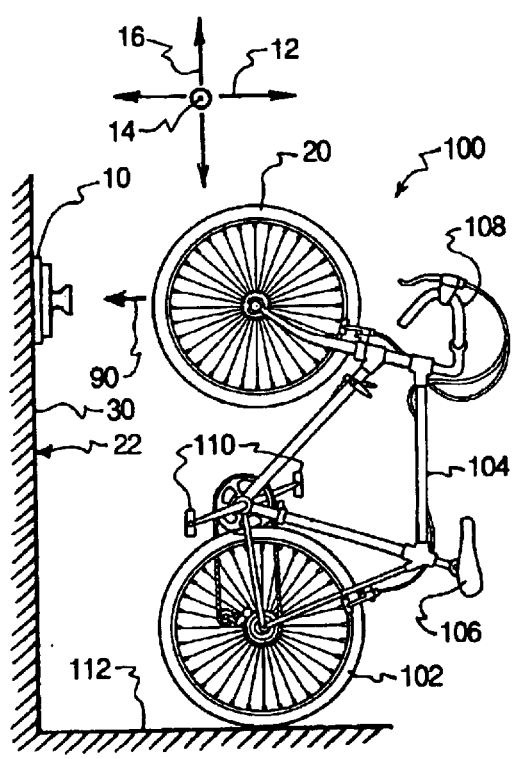
FIG. 4 is a side elevation view of a bicycle aligned for storage using the apparatus of FIG. 1, with the apparatus in the open and unlocked position illustrated in FIG. 1.

Referring to FIG. 4, a side elevation view illustrates a bicycle 100 that may be easily stored or removed from storage through the use of the apparatus 10. As illustrated, the bicycle 100 has a rear wheel 102, a frame 104, a seat 106, handlebars 108, and pedals 110, in addition to the front wheel 20. Immediately after a user has ridden the bicycle 100, the bicycle 100 is not disposed vertically as illustrated in FIG. 4, but is generally horizontal with both wheels 20, 102 in contact with the ground 112.

To store the bicycle 100, a user may first grasp the handlebars 108 and pull them upward while pivoting the frame 104 such that the front wheel 20 is disposed generally above the rear wheel 102. The wheel 20 is disposed within the substantially vertical plane. The user may move the bicycle 100, for example, by moving the handlebars 108 while continuing to allow the rear wheel 102 to rest on the ground 112 until the bicycle 100 is aligned with the apparatus 10, as illustrated in FIG. 4. The apparatus 10 is disposed as illustrated in FIG. 1. The user may then move the handlebars to move the wheel 20 in the engagement direction, as illustrated by FIG. 1.

Figure 5:
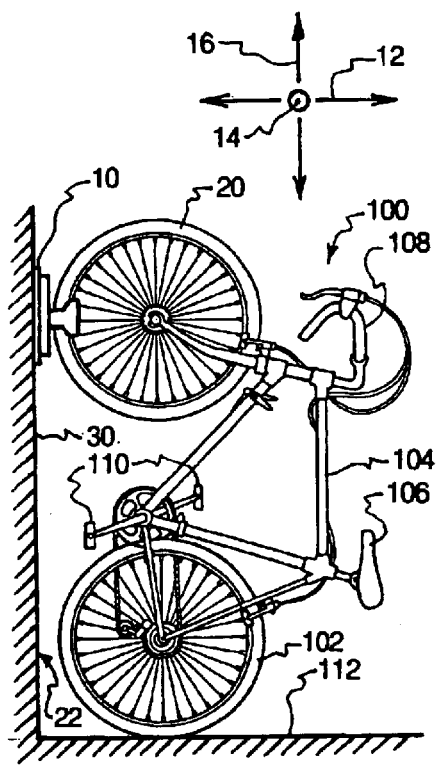
FIG. 5 is a side elevation view of the bicycle, with the apparatus in the closed and unlocked position illustrated in FIG. 2.

Referring to FIG. 5, a side elevation view illustrates the bicycle 100 when the front wheel 20 and the remainder of the bicycle 100 have been moved in the engagement direction. In response to contact of the front wheel 20 against the receiving ends 84, the locking arms 44, 46 have been moved to the closed configuration as illustrated by FIG. 2. The front wheel 20 is still within the substantially vertical plane so that the bicycle 100 is not locked in place by the apparatus 10. From the configuration of FIG. 5, the user may rotate the handlebars 108 to urge the core member 42 and the locking arms 44, 46 to rotate into the configuration illustrated in FIG. 3.

Figure 6:
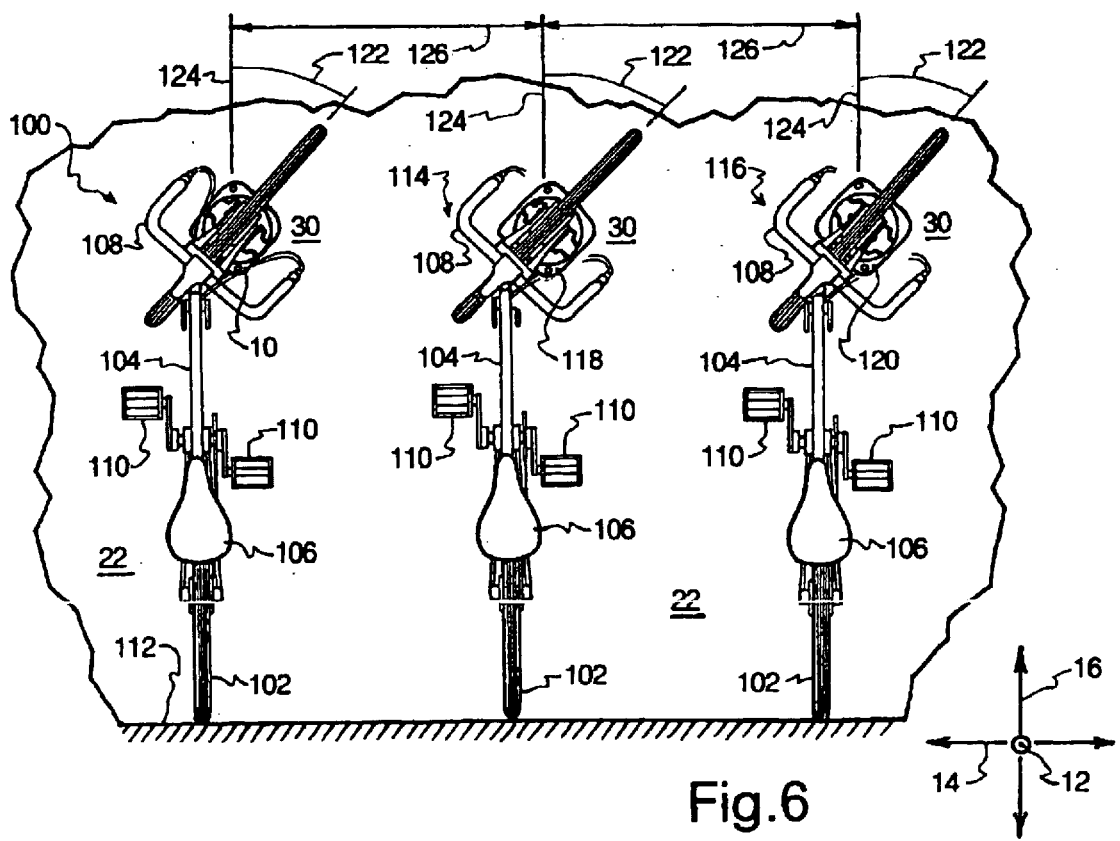
FIG. 6 is a rear elevation view of the bicycle together with a second bicycle stored with a second apparatus and a third bicycle stored with a third apparatus, with each apparatus in the closed and locked position illustrated in FIG. 3.

Referring to FIG. 6, a rear elevation view illustrates the resulting configuration of the bicycle 100 after rotation of the handlebars 108 in the manner indicated previously. The bicycle 100 is stored adjacent to a second bicycle 114 and a third bicycle 116. The locking arms 44, 46 are locked such that the bicycle 100 is retained by the apparatus 10. The rear wheel 102 may continue to rest on the ground 112. The second and third bicycles 114, 116 are retained by second and third bicycle storage apparatuses 118, 120 that are similar in configuration to the apparatus 10 of FIG. 1.

Hence, the user may store the bicycle 100 with the apparatus 10 by simply utilizing the handlebars 108 to move the front wheel 20. The user need not even touch the apparatus 10 to store the bicycle 100. The user also need not lift the entire weight of the bicycle 100 from the ground 112 to store the bicycle 100. The opposite procedure is followed to remove the bicycle 100 from storage. Consequently, the user may also remove the bicycle 100 from the apparatus 10 by moving the handlebars 108, without even touching the apparatus 10 or lifting the entire weight of the bicycle 100.

Bicycle storage using the apparatus 10 is relatively compact because the bicycle 100 is stored in a substantially vertical configuration. The apparatuses 10, 118, 120 may be arrayed in a generally horizontal line along the wall 22 to enable the bicycle 100 to be stored parallel with the second and third bicycles 114, 116, as shown in FIG. 6. As shown, the handlebars 108 have been rotated in such a manner that the front wheels 20 of the bicycles 100, 114, 116 have been rotated by an angle 122 with respect to a substantially vertical plane 124. The handlebars 108 are therefore staggered from the corresponding handlebars of the bicycles 114, 116. As a result, the bicycles 100, 114, 116 may be stored with a spacing 126 that is comparatively small.

According to one example, the angle 122 ranges from about 30° to about 60°. More specifically, the angle 122 may be about 45°. The resulting spacing 126 may be approximately sixteen inches. The tabs 64, 66 ensure that the front wheels 20 of the bicycles 100, 114, 116 must rotate in the same direction (i.e., clockwise), and with approximately the same angle 122 (i.e., the maximum angle or less) to avoid interference of the front wheels 20 and/or handlebars 108 with each other. In alternative embodiments, counterclockwise wheel rotation may be used instead of clockwise rotation.

In other alternative embodiments, the wheel 20 may be inserted into engagement with the bicycle storage apparatus along an angle with respect to the substantially vertical plane 124. The wheel 20 may then be rotated to a different angle with respect to the substantially vertical plane 124, or may be rotated into the substantially vertical plane 124 itself. Thus, the bicycle 10 may be retained in place with the front wheel 20 within the substantially vertical plane 124.

Such operation may be obtained with the apparatus 10 by rotating the apparatus 10 about the longitudinal direction 12 by an angle, for example, 45°, before attaching the apparatus 10 to the wall 22. Such a disposition may, however, require a greater spacing between adjacent bicycles 100, 114, 116 because the handlebars 108 of the bicycles 100, 114, 116 may extend further along the lateral direction 14.

The apparatus 10 may be relatively easily and inexpensively manufactured. According to one example, the collar 40, the core member 42, and the locking arms 44, 46 are all constructed of plastic. The collar 40, the core member 42, and the locking arms 44, 46 may thus be formed by blow molding or the like. According to one example, the collar 40, the core member 42, and the locking arms 44, 46 are each shaped to be molded though the use of a simple, dual-plate process, in which the mold plates can be withdrawn from each other without interference from the molded part. The manner in which this is accomplished will be shown and described in greater detail in connection with FIGS. 7 and 8, as follows.

Referring to FIG. 7, a perspective view illustrates the collar 40 in alignment with a workpiece 134. The collar 40 and the workpiece 134 have each been blow molded with simple dual plate operations. The workpiece 134, after assembly and manipulation, will become the core member 42.

As illustrated, the collar 40 has an outer peripheral edge 136 with a generally cylindrical profile. The outer peripheral edge 136 is positioned to be adjacent to the wall 22 and has a diameter slightly larger than that of the interior surface 56. A plurality of tabs 138 extend inward from the outer peripheral edge 136.

As illustrated in FIG. 7, four tabs 138 are provided. Each of the tabs 138 is aligned with a notch 140 formed in the interior surface 56. The notches 140 serve to facilitate manufacture of the tabs 138 because both mold plates (not shown) are able to be withdrawn from the tabs 138 along the longitudinal direction 12 without interference from the molded collar 40. The collar 40 also has an annular retention surface 142 that extends from the interior surface 56 to the outer peripheral edge 136.

The workpiece 134 has an outward side 144 and an inward side 146. In the context of the outward and inward sides 144, 146, "inward" and "outward" refer to a position with respect to the wall 22. Thus, when the apparatus 10 is attached to the wall 22, the inward side 146 is closest to the wall 22 and the outward side 144 is furthest from the wall 22. Thus, the outward side 144 is the side that is exposed and visible after attachment of the apparatus 10 to the wall 22.

The workpiece 134 also has an outer edge 148 with a generally cylindrical profile and a diameter larger than that of the peripheral edge 70. An annular extension 149 extends from the peripheral edge 70 to the outer edge 148. A plurality of notches 150 are formed in the outer edge 148, and are distributed in alignment with the tabs 138 of the collar 40. The notches 150 are slightly larger than the tabs 138 so that, upon insertion of the workpiece 134 into the collar 40, the tabs 138 are able to pass through the notches 150.

As illustrated, the anchors 72 are formed in the workpiece 134 in an orientation approximately ninety degrees from the desired orientation of the anchors 72 in the core member 42. Thus, the anchors 72 have holes 152 with axes generally perpendicular to the outward side 144 of the workpiece 134. With such a configuration, the workpiece 134 may also be formed by a blow molding operation that utilizes two mold plates (not shown) that can be withdrawn along the longitudinal direction 12. The mold plate proximate the outward side 144 may be withdrawn from the holes 152 without interference from the anchors 72.

The anchors 72 are attached to the remainder of the workpiece 134 via segments of material that are thin enough to form living hinges 154 that permit pivotal motion of the anchors 72 with respect to the remainder of the workpiece 134. Hence, each of the anchors 72 has a rounded end 156 that is not attached to the remainder or can be punched out of the workpiece 134. Rather, the workpiece 134 has a plurality of attachment ridges 158 disposed adjacent to the rounded ends 156 of the anchors 72. The attachment ridges 158 serve to keep the anchors 72 in their properly rotated state, as will be described in greater detail in connection with FIG. 8.

Prior to manipulation of the anchors 72, the workpiece 134 is rotationally aligned with the collar 40 such that the notches 150 of the outer edge 148 are aligned with the tabs 138 extending from the outer peripheral edge 136 of the collar 40, as illustrated in FIG. 7. In such a disposition, the workpiece 134 is rotated slightly counterclockwise from the unlocked orientation of the core member 42 illustrated in FIG. 1. As will be described in connection with FIG. 8, the core member 42 is unable to achieve such an orientation again after attachment of the locking arms 44, 46.

When the workpiece has been properly oriented with respect to the collar 40, the workpiece 134 is inserted into the collar 40 along an assembly direction illustrated by an arrow 160. As shown, the assembly direction is generally parallel to the longitudinal direction 12. As the outer edge 148 of the workpiece 134 passes along the outer peripheral edge 136 of the collar 40, the tabs 138 of the collar 40 pass through the notches 150 of the workpiece 134. When the annular extension 149 of the workpiece 134 abuts the annular retention surface 142 of the collar 40, the tabs 138 are disposed outside the notches 150 of the workpiece 134 so that the workpiece 134 is rotatable with respect to the collar 40. Thus, the workpiece 134 can be rotated along a retention direction, illustrated by an arrow 162, to move the notches 150 out of alignment with the tabs 138.

The workpiece 134 is then retained within the collar 40. The workpiece 134 is unable to move longitudinally because in one direction, the annular extension 149 of the workpiece abuts the annular retention surface 142 of the collar, and in the other direction, the outward side 144 of the workpiece 134 abuts the tabs 138 of the collar 40. Hence, when the collar 40 is attached to the attachment portion 30 of the wall 22, the core member 42 does not rotate against the attachment portion 30 and cannot be drawn longitudinally free of the collar 40.

After the workpiece 134 has been inserted into the collar 40 and rotated such that the workpiece 134 is retained by the collar 40, the workpiece 134 may be manipulated to provide the core member 42 illustrated in FIGS. 1–3. The steps that are performed on the workpiece 134 will be further shown and described in connection with FIG. 8.

Referring to FIG. 8, a side elevation, section view illustrates the workpiece 134 after insertion and retention within the collar 40. The collar 40 and the first locking arm 44 are also shown in section. As illustrated, the holes 150 initially lie generally flush with the outward side 144 of the workpiece 134. The anchors 72 extend through anchor cavities 172 and through the inward side 146 of the workpiece 134. The rounded end 156 of each anchor 72 has an extended portion 174 that is flattened or rounded with a radius from the associated living hinge 154 that is somewhat larger than that of the remainder of the rounded end 156. The extended portion 174 of each rounded end 156 has a notch 176 that extends around a section of the rounded end 156 to engage the corresponding attachment ridge 158.

The anchors 72 are designed to be moved into their intended positions simultaneously with engagement of the associated locking arm 44 or 46. Hence, prior to manipulation of the anchors 72, the locking arms 44, 46 are positioned. According to one exemplary method of assembly, the locking arms 44, 46 are disposed such that the locking abutments 86 extend into the breaks 60, as illustrated in FIG. 1 or FIG. 2. The shafts 80 of the locking arms 44, 46 extend toward the desired positions of the anchors 72. The workpiece 134 is rotated to the orientation of the core member 42 depicted in FIGS. 1 and 2 so that the anchors 72 can pivot into engagement with the locking arms 44, 46. This is the disposition of the workpiece 134 as illustrated in FIG. 8.

Once the locking arms 44, 46 are in place, the anchors 72 are pivoted about their associated living hinges 154, as indicated by the arrows 180. Final positions 182 of the anchors 72 are shown in phantom. The holes 152 of the anchors 72 pivot into engagement with the shafts 80 of the locking arms 44, 46. As the anchors 72 pivot, the extended portions 174 of the rounded ends 156 press increasingly against the attachment ridges 158. When the anchors 72 reach the final positions 182, the attachment ridges 158 snap into engagement with the notches 176 of the extended portions 174.

Thus, the anchors 72 are unable to over-rotate, and cannot be pivoted back to their original positions. The anchors 72 thus relatively permanently retain the locking arms 44, 46 once they reach their final positions 182. When the anchors 72 are in the final positions 182, the core member 42 has been formed. As mentioned previously, the tabs 64 prevent counterclockwise rotation of the core member 42 from the orientation illustrated in FIGS. 1 and 2. Thus, the core member 42 cannot be rotated into a position in which the tabs 138 of the collar 40 are again aligned with the notches 150 of the core member 42. Hence, the core member 42 is relatively permanently engaged within the collar 40.

The foregoing is only one of many different manufacturing methods that may be employed to produce the apparatus 10 or a bicycle storage apparatus according to an alternative embodiment of the invention. Those of skill in the art will recognize that many different embodiments of the bicycle storage apparatus, manufacturing method, and the associated method of use exist within the scope of the present invention.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed is:

1. An apparatus for securing a bicycle to a wall, the apparatus comprising:

a base member attachable to the wall;

a shuttle movable between an unlocked position and a locked position with respect to the base member;

a first locking arm attachable to the shuttle such that the first locking arm is movable with respect to the shuttle between a closed position that blocks withdrawal of the bicycle from the apparatus and an open position that permits withdrawal of the bicycle, wherein the first locking arm is unable to move to the open position when the shuttle is in the locked position; and wherein the base member comprises a collar and the shuttle comprises a core member rotatably captured by the collar.

2. The apparatus of claim 1, further comprising a second locking arm disposed to cooperate with the first locking arm, wherein the second locking arm is movable between a closed position that blocks withdrawal of the bicycle from the apparatus and an open position that permits withdrawal of the bicycle, and wherein the second locking arm is unable to move to the open position when the shuttle is in the locked position.

3. The apparatus of claim 1, wherein the locking arm is shaped to retain a front wheel of the bicycle in the closed position, wherein the locking arm is oriented such that the front wheel of the bicycle is disposed within a substantially vertical plane when the core member is in the unlocked position, and wherein the front wheel is angled from the substantially vertical plane when the core member is in the locked position.

4. The apparatus of claim 3, wherein the base member comprises at least one limiting feature that limits rotation of the core member relative to the collar such that the wheel can only be angled up to about 45 degrees from the substantially vertical plane along a single rotational direction.

5. The apparatus of claim 1, wherein the first locking arm has a gripping end disposed inward of a rim of a wheel of the bicycle in the closed position to interfere with withdrawal of the wheel from the apparatus.

6. The apparatus of claim 5, wherein the first locking arm has a receiving end disposed to receive contact from the wheel to induce the first locking arm to pivot from the open position into the closed position.

7. The apparatus of claim 1, wherein the base member comprises a retention feature disposed to prevent motion of the locking arm to the open position when the shuttle is in the locked position.

8. The apparatus of claim 7, wherein the first locking arm is pivotally attached to the shuttle, wherein the retention feature comprises an arcuate lip and the first locking arm comprises a locking abutment that abuts the arcuate lip when the shuttle is in the locked position to prevent the first locking arm from pivoting to the open position.

9. An apparatus for securing a bicycle to a wall, the apparatus comprising:
   a base member attachable to the wall;
   a shuttle movable between an unlocked position and a locked position with respect to the base member; and
   first and second locking arms movably attachable to the shuttle, the locking arms each comprising a receiving end disposed to receive contact from a wheel of the bicycle to induce each locking arm to pivot from an open position to a closed position with respect to the shuttle, wherein the open position permits withdrawal of the wheel and the closed position blocks withdrawal of the wheel.

10. The apparatus of claim 9, wherein the base member comprises a collar and the shuttle comprises a core member rotatably captured by the collar.

11. The apparatus of claim 10, wherein the locking arms are oriented to receive the wheel along a substantially vertical plane when the core member is in the unlocked position, wherein rotation of the wheel to an angle with respect to the substantially vertical plane induces rotation of the core member to the locked position.

12. An apparatus for securing a bicycle to a wall, the apparatus comprising:
   a base member attachable to the wall;
   a shuttle rotatable with respect to the base member; and
   a first locking arm disposable to move from an open position to a closed position to retain a wheel of the bicycle;
   wherein the shuttle rotates in response to rotation of the wheel with respect to a substantially vertical plane to lock the first locking arm in the closed position.

13. The apparatus of claim 12, further comprising a second locking arm disposable to move from an open position to a closed position to retain the wheel.

14. The apparatus of claim 13, wherein each of the locking arms is pivotally attached to the shuttle, each of the locking arms comprising a gripping end disposed inward of a rim of the wheel in the closed position to interfere with withdrawal of the wheel from the apparatus.

15. The apparatus of claim 14, wherein the shuttle rotates from an unlocked position to a locked position in response to rotation of the wheel with respect to the substantially vertical plane, wherein the base member comprises an arcuate lip disposed to prevent motion of the locking arm to the open position when the shuttle is in the locked position, the first locking arm further comprising a locking abutment that abuts the arcuate lip when the shuttle is in the locked position to prevent the first locking arm from pivoting to the open position.

16. The apparatus of claim 12, wherein the first locking arm is disposed to move from the open position to the closed position in response to insertion of the wheel along the generally vertical plane, wherein the shuttle rotates in response to rotation of the wheel from the substantially vertical plane.

17. The apparatus of claim 16, wherein the base member comprises at least one limiting feature that limits rotation of the core member relative to the collar such that the wheel can only be angled up to about 45 degrees from the substantially vertical plane along a single rotational direction.

18. A method for manufacturing an apparatus for securing a bicycle to a wall, the method comprising:
   forming a base member;
   forming a shuttle having a shape selected to movably engage the base member;
   forming a first locking arm; and
   attaching the first locking arm to the shuttle such that the first locking arm is movable with respect to the shuttle between a closed position capable of retaining a wheel of the bicycle and an open position that permits withdrawal of the wheel, wherein forming the first locking arm comprises providing a locking feature that engages the base member upon engagement of the shuttle with the base member to enable motion of the shuttle with respect to the base member to lock the first locking arm in the closed position.

19. The method of claim 18, wherein forming the base member comprises forming a collar and forming the shuttle comprises forming a core member shaped to be rotatable within the collar.

20. The method of claim 18, wherein forming the shuttle comprises:
   molding a plastic to form a workpiece having an outward side and an inward side, the workpiece having at least one anchor disposed proximate the inward side and coupled to the outward side via a living hinge;
   folding the living hinge to dispose the anchor proximate the outward side; and
   attaching the anchor to the outward side to form the shuttle.

21. The method of claim 20, wherein molding the plastic to form the workpiece comprises forming a notch in the anchor and forming an attachment ridge proximate the anchor, wherein attaching the anchor to the outward side comprises pivoting the anchor such that the notch engages the attachment ridge.

22. The method of claim 18, further comprising:
   forming a second locking arm; and
   attaching the second locking arm to the shuttle such that the second locking arm is movable with respect to the shuttle between a closed position capable of retaining the wheel and an open position that permits withdrawal of the wheel, wherein forming the second locking arm comprises providing a locking feature that engages the base member upon engagement of the shuttle with the base member to enable motion of the shuttle with respect to the base member to lock the second locking arm in the closed position.

23. The method of claim 18, wherein forming the shuttle comprises forming at least one anchor, wherein attaching the first locking arm to the shuttle comprises pivotally attaching the first locking arm to the anchor.

24. The method of claim 18, wherein forming the shuttle comprises forming a retention feature, the method further comprising disposing the shuttle in rotatable engagement with the base member such that the locking feature is rotatable into engagement with the retention feature to lock the first locking arm in the closed position until rotation of the shuttle with respect to the base member is reversed.

25. A method for securing a bicycle to a wall through the use of an apparatus comprising a base member attached to the wall, a shuttle movable between an unlocked position and a locked position with respect to the base member, and a first locking arm attached to the shuttle such that the first locking arm is movable with respect to the shuttle between a closed position that blocks withdrawal of the bicycle from the apparatus and an open position that permits withdrawal of the bicycle, the method comprising:

orienting the bicycle such that a front wheel of the bicycle is disposed generally above a rear wheel of the bicycle;

contacting the first locking arm with the front wheel to move the first locking arm to the closed position; and rotating the front wheel with respect to a substantially vertical plane to induce the first locking arm to move to the closed position.

26. The method of claim 25, wherein the first locking arm comprises a gripping end and a receiving end, wherein contacting the first locking arm with the front wheel comprises pressing against the receiving end with the front wheel to induce the gripping end to pivot such that the gripping end blocks withdrawal of the front wheel from the apparatus.

27. The method of claim 25, wherein the apparatus further comprises a second locking arm attached to the shuttle such that the second locking arm is movable with respect to the shuttle between a closed position that blocks withdrawal of the bicycle from the apparatus and an open position that permits withdrawal of the bicycle, the method further comprising contacting the second locking arm with the front wheel, substantially simultaneously with contacting the first locking arm, to move the second locking arm to the closed position.

28. The method of claim 25, wherein rotating the front wheel with respect to the substantially vertical plane comprises rotating the front wheel about 45 degrees from the substantially vertical plane.

* * * * *